United States Patent

[11] 3,580,441

| [72] | Inventor | Richard C. Zercher |
| | | Box 130A, R.D. 2, Lititz, Pa. 17543 |
| [21] | Appl. No. | 820,487 |
| [22] | Filed | Apr. 30, 1969 |
| [45] | Patented | May 25, 1971 |

[54] CLAMPLESS FENDER MOUNTED BRACKET
3 Claims, 3 Drawing Figs.

[52] U.S. Cl. .................................................... 224/42.31, 224/42.45R
[51] Int. Cl. .................................................... B60r 9/00
[50] Field of Search .......................................... 224/42.45, 42.31, 42.32, 42.16, 29; 248/205

[56] References Cited
UNITED STATES PATENTS
1,552,535  9/1925  Beerstecher ................. 224/42.31
2,241,076  5/1941  Sundstrom ................... 224/42.31
2,593,796  4/1952  Riewerts ...................... 224/42.44

*Primary Examiner*—Gerald M. Forlenza
*Assistant Examiner*—Robert J. Spar
*Attorney*—Robert P. Williams ABSTRACT: A cargo-carrying bracket adapted to be attached to a fender without clamps includes a load-bearing member adapted to be received in an inwardly directed channel on the edge of the fender, a load-supporting element extending from the load-bearing element, and a counterbalancing brace extending from the load-bearing element and adapted to engage the inner surface of the fender to balance a load applied to the load-supporting element.

PATENTED MAY 25 1971 3,580,441
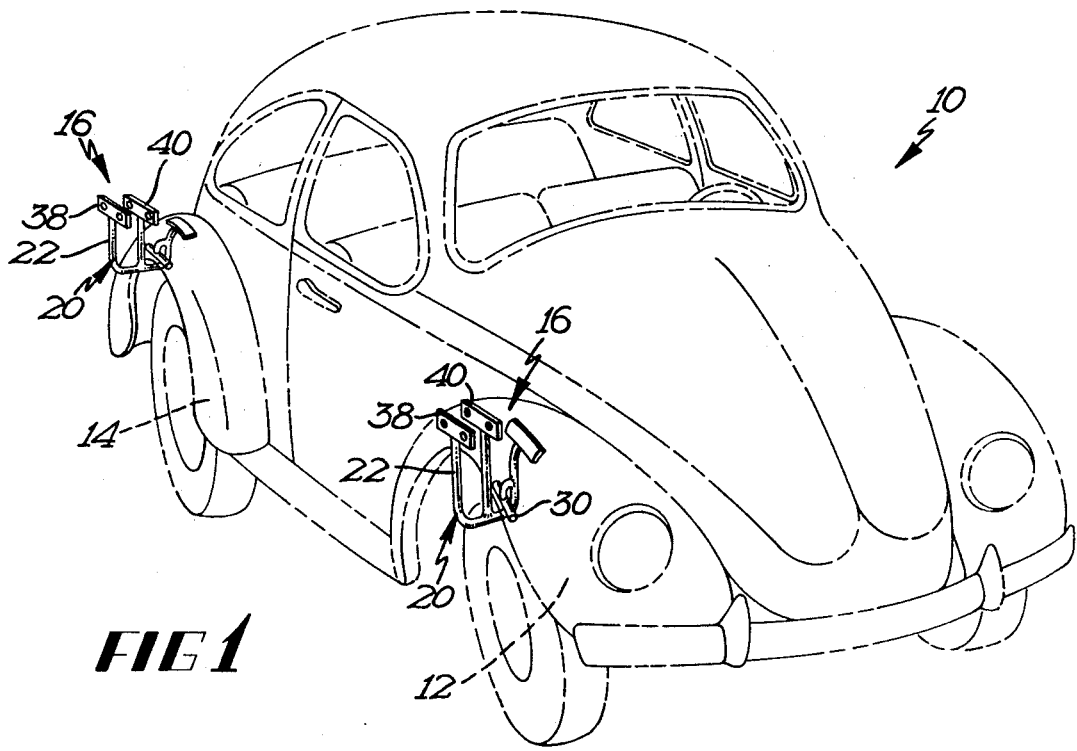
FIG 1
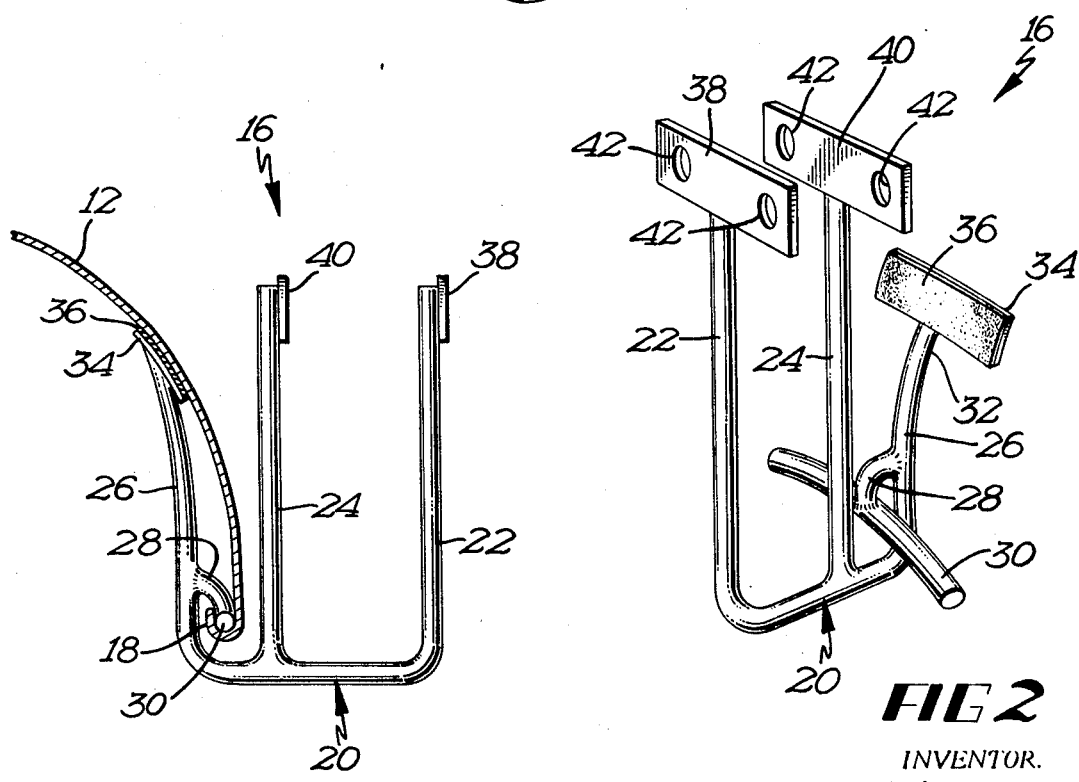
FIG 3
FIG 2
INVENTOR.
RICHARD C. ZERCHER
BY
ATTORNEY

CLAMPLESS FENDER MOUNTED BRACKET

BACKGROUND OF THE INVENTION

This invention relates to the art of brackets. More particularly, the invention pertains to a bracket adapted to be mounted, without the use of clamps, on an automotive vehicle.

Several forms of brackets adapted to be attached to vehicles to enable the carrying of elongated items such as ladders, lumber, fishing poles, and the like, are known. In general, these devices have required clamps to engage a part of a vehicle such as a drip molding or the peripheral edge of a fender or, if no clamps have been used, there have been braces and like elements which engaged the exterior finish of the car. One known bracket which employs such a construction is that shown in the Sundstrom Patent U.S. Pat. No. 2,241,076 issued May 6, 1941. The Sundstrom arrangement, while quite satisfactory in terms of its performance of the supporting function, is complex and uneconomical since it uses several different parts and is adapted only for the carrying of ladders. The fender engaging portions of the Sundstrom ladder carrier employ elements which engage an inwardly directed channel on the edge of a fender. However, in order to support a ladder, an additional bracket element is required which bracket contacts the exterior finish of the vehicle.

SUMMARY OF THE INVENTION

It is an object of the present invention to provide a bracket adapted to be attached to an automotive vehicle which has a fender with an inwardly directed channel, the bracket being free of clamps and having no mechanical contact with the exterior finish of the fender.

This object is satisfied by the present bracket which is a unitary structure having a load-bearing element adapted to engage the inwardly directed channel of a vehicle fender and, extending from the load-bearing element in one direction, an article supporting means adapted to lie outside and clear of the fender. Extending in the opposite direction from the load-bearing element is a brace adapted to engage the interior surface of the fender to apply a counterbalancing moment in opposition to that produced by the application of a load to the article-supporting element of the device. Loads up to several hundred pounds can be accommodated by the device when used on a standard sheet metal fender and, when two of the present devices are used, one on the front fender and one on the rear fender of the vehicle, loads of relatively great length can be accommodated.

THE DRAWINGS

FIG. 1 is a perspective view of a vehicle, in phantom outline, showing two of the present novel brackets attached to the fenders thereof;

FIG. 2 is an enlarged perspective view of the present novel bracket; and

FIG. 3 is a side view of the present novel bracket in place on a vehicle fender.

THE PREFERRED EMBODIMENT

A vehicle with which the present novel bracket is adapted to be used is shown in phantom outline in FIG. 1 of the drawings and is indicated generally by the reference numeral 10. The vehicle 10 has a front fender 12 and a rear fender 14 and, as shown in FIG. 1, a bracket 16 is associated with each of the fenders 12 and 14.

The present novel bracket 16 is adapted to be used on a vehicle having a fender which is provided with an internal channel at a peripheral edge thereof. With reference to FIG. 3 a fender 12 is shown which has such a channel 18 at the lower peripheral edge thereof. While not all vehicles presently marketed in the Unites States are provided with such channels, there are many which do have them and the invention may be used advantageously on all such vehicles.

Referring now to FIG. 2, the construction of the bracket 16 will now be described with particularity. The bracket 16 in the present preferred embodiment is made up of tubular steel stock with the various elements joined together, as by welding, to form a unitary structure. It will be understood that the brackets may be assembled from individual parts of other types.

As shown in FIG. 2, the bracket 16 includes an elongated rodlike element 20 which has at or adjacent one of its ends a means for receiving an article to be supported by the bracket. In this instance the article-receiving means comprises a pair of parallel rods 22 and 24 which extend vertically when the bracket 16 is in place on the vehicle. The rod 22 in the preferred embodiment shown is merely an extension of the rod 20 at a right angle to the general direction thereof. The rod 20 also has a portion 26 which is adapted to extend inside the vehicle fender. Attached to the portion 26 of the rod 20 is a link 28 which supports an elongated, curved load-bearing element 30. The element 30 extends, as shown, in a direction transverse to the rod 20. It is so shaped as to lie within the channel 18 of the fender and is of such length as to spread the load of the bracket over a substantial portion of the channel 18.

The portion 26 of the rod 20 which lies above the point of attachment of the link 28 constitutes a brace which serves to oppose the moment of force produced by a load applied to the article-receiving parts of the bracket. In other words, when a load is applied onto the rod 20 between the lateral confining elements 22 and 24 a moment of force is produced about the axis of the load-bearing element 30 within the interior of the channel 18. The brace portion 26 of the rod 20 then contacts the fender at a point spaced upwardly from the channel 18 and provides a reaction force in opposition to the force of the load. In order to spread the load of the reaction force over a substantial area of a sheet metal fender, the portion 26 of the rod 20 may carry at its free end 32 a bearing pad 34 which preferably is slightly curved in order to conform to the interior shape of the fender. If desired the bearing pad 34 may be provided with a resilient covering indicated at 36 which may be of rubber or vinyl plastic, or the like.

Preferably, anchor points are provided for securing a cargo-lashing line to the bracket 16. For example, the lateral confining rods 22 and 24 may be provided at their upper ends with bars 38 and 40 respectively which have apertures 42 provided therethrough. A cargo lashing line, not shown, may be threaded through the apertures 42 and tied to the bars 38 and 40 in order to secure a load in place on the brackets 16.

While the bracket 16 has been shown in this embodiment to be made up of cylindrical stock, it will be understood that any form of assembly may be selected, so long as the various elements which have been described above are included in rigid relation to each other. For example the bracket 16 may have parts made by stamping from flat stock rather than tubular stock and spot welded or riveted together. Another method of fabrication of the bracket 16 might be casting or forging the bracket as a single piece. The point of maximum stress in the bracket 16 is on the load-bearing element 30 and the strength of the material selected for the bracket 16 will dictate the physical size of this part. It will be understood that lateral braces (not shown) may be included between the link 28 and the load-bearing part 30 to improve the rigidity of the structure.

It is suggested that care be exercised in designing the actual size of the bracket 16 to insure that when it is applied to a vehicle no regulations which may be prescribed by certain states are violated. For example, Pennsylvania law requires that a bracket such as the present one extend no more than 6 inches outside the fender of the vehicle.

While only one form of the present novel bracket has been illustrated and described in detail it will be apparent to those skilled in the art that various modifications may be made without departing from the scope of the appended claims.

I claim:

1. A bracket adapted to be mounted on an automotive vehicle having a fender, said fender having an inwardly directed channel thereon, said bracket comprising,
   a load-bearing element adapted to rest in said channel in said fender,
   article-supporting means connected to said load-bearing element and adapted to be positioned in article-receiving position on the exterior of said fender, and
   brace means connected to said supporting means and extending in an opposite relation to said article-supporting means and being adapted to engage the interior surface of said fender when said bracket is attached to said fender to impart a counter moment in resistence to pivotal moments produced by the application of a load to said article supporting means.

2. A bracket adapted for use with an automotive vehicle which has a sheet metal fender with an open inwardly directed channel adjacent to a peripheral edge thereof, said bracket comprising,
   an elongated rodlike member having adjacent one end thereof means for receiving and supporting an article and having adjacent to the other end thereof a bearing pad adapted to engage the inner surface of said fender, said member having intermediate its ends a load-bearing element extending transversely with respect to said elongated rodlike member and adapted to be received in pivotal relationship within said channel in said fender.

3. A bracket as defined in claim 2 wherein said article-receiving means comprises a pair of spaced parallel rods extending generally vertically when said bracket is in position on said fender, said rods having at their free ends means for receiving and securing a flexible line thereto.